Nov. 9, 1965    W. H. DAVIS ET AL    3,216,565
BAND SAW PACKAGE

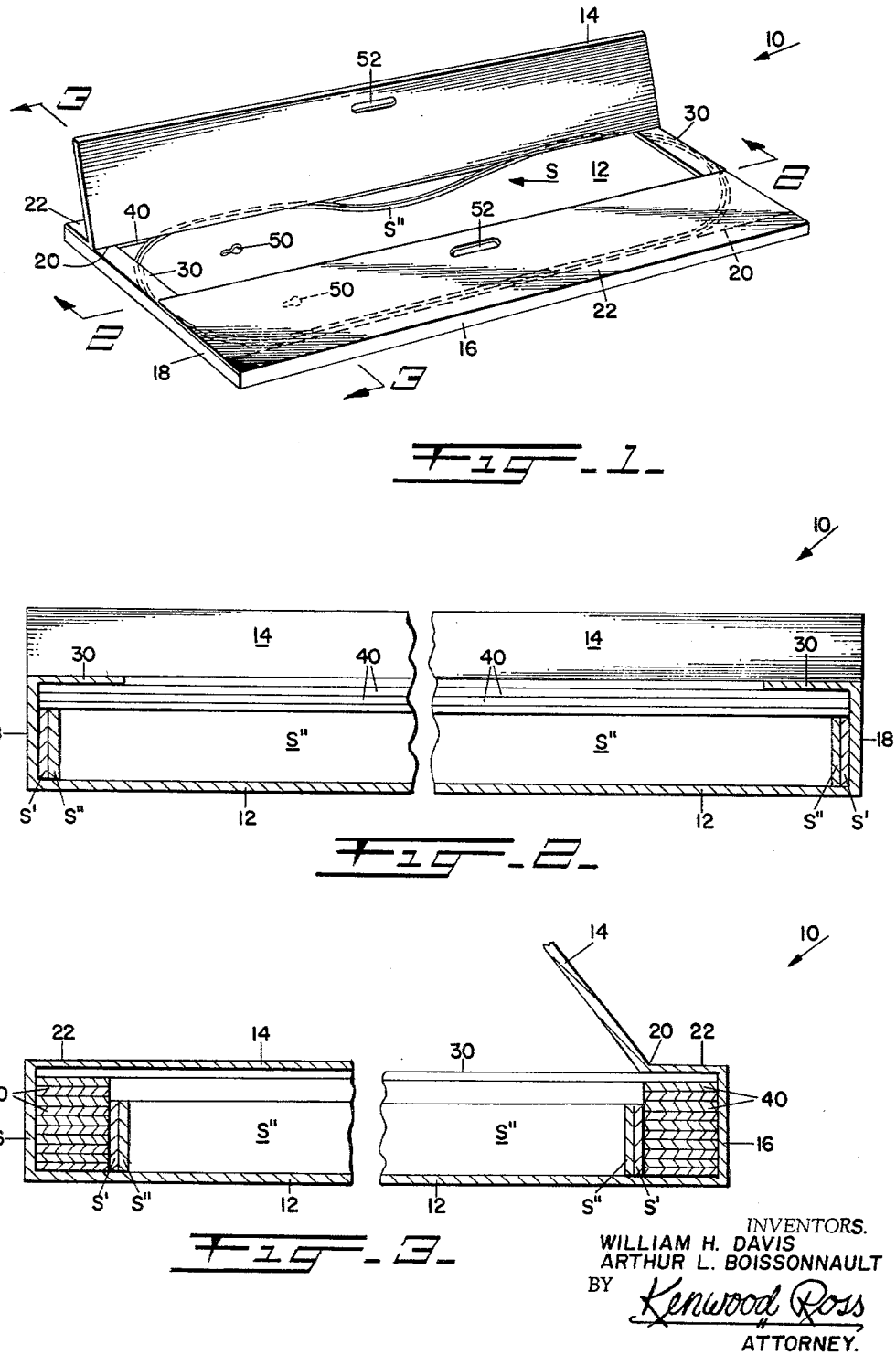

Filed March 26, 1964    2 Sheets-Sheet 2

INVENTORS.
WILLIAM H. DAVIS
ARTHUR L. BOISSONNAULT
BY Kenwood Ross
ATTORNEY.

3,216,565
BAND SAW PACKAGE

William H. Davis, Wilbraham, and Arthur L. Boissonnault, Fairview, Mass., assignors to American Saw & Mfg. Company, Springfield, Mass.
Filed Mar. 26, 1964, Ser. No. 355,005
2 Claims. (Cl. 206—65)

This invention relates to improved packaging means for supporting, maintaining, and storing a plurality of bands, blades, or like members, in nested relationship, within a container, while enabling the user conveniently and at will to withdraw any desired band or blade or any plurality thereof from the multiplicity thereof so nested within the container.

The invention comprehends packaging means for blade-like elements comprising a container and support means therewithin for engaging with the blade-like elements in manner suitable to support same in their initial precision form so that the more sensitive portions thereof, as for instance the teeth thereof in the case of saw blades, do not contact any of the container walls. Conveniently, the support means may extend longitudinally of and in supporting engagement with a group of such elements which may be disposed in a side-by-side relationship.

Heretofore, no practical package has been available for the shipping and handling of saw bands. Consequently, the handling of the bands, especially during removal thereof, has been attended with considerable difficulties. The tension under which the bands have been placed, upon being coiled in diameters sufficiently small for convenient handling, has been such as to cause them to spring open when handled by an operator, and this for the reason that the inherent nature of a welded bandsaw blade is such as to cause it to function much in the manner of a wound up clock spring and to tend to expand making handling thereof difficult and in some instances dangerous.

The present invention overcomes such objectionable tendency through the provision of a novel package designed so as safely to enclose a plurality of saw bands in a manner permitting any desired band to be easily removed therefrom when and as desired.

Prior hereto, coils of bandsaw stock and/or bandsaw blades normally have been shipped as coils held intact as by wire bindings. The blades themselves have been awkward in their handling because of this aforementioned spring tendency. Also, especially in the case of the narrower widths, the bands of stock tend to become scrambled instead of laying flat.

The invention has, as one of its objects, the provision of a new and novel compact and convenient package for shipping and handling bandsaw blades. In particular, it relates to a container which is quickly and easily loaded so as readily to accommodate a wide range of bandsaw blade sizes and which is as quickly and easily unloaded, when and as it is desired to withdraw blades therefrom.

Advantageously, the containers which are shown as illustrative embodiments of this invention may incorporate large hand openings and mounting openings, wherefore they may be easily carried in one hand, even when loaded with the larger, heavier widths of bandsaw stock, and are likewise convenient for mounting or hanging from any suitable support so as to enable both hands to be used in withdrawing the blade or blades therefrom.

In one specific illustrative embodiment, a package is provided for blades which have been cut to desired lengths, but wherein the ends of said blades have not been joined to form an endless coil. In such embodiment, the user draws the blades through a convenient opening in the package and, after the blades have been completely withdrawn, joins the blade ends together by welding or other suitable means, the package being completely closed during shipment to the user, and the user cutting the blade withdrawal opening in an area of the package along lines prescored by the supplier.

After the blades of bandsaw stock have been consumed, the containers of the embodiments may be disposed of as may be desired by the consumer, said containers representing little value following consumption.

Another object of this invention is to provide a package of the character described which is so designed that the normal resiliency of the blades, acting through the tension under which they are placed upon being coiled, is exploited so as to serve frictionally to hold same against displacement within the package, the blade-confining space being sufficiently snug as to preclude the scrambling of blades, with the need for the conventional use of hooks or other restraining means being obviated, each blade size being held snugly therewithin with a sufficiency of clearance to provide ease in withdrawing or re-inserting a blade or blades.

To provide the desired frictional engagement throughout the area of the outermost blade within the package, pads or blocks or fillers within the container may serve advantageously to urge the said outermost blade into such a configuration that only portions thereof are in frictional engagement with the container walls, all so as to facilitate the ready and easy withdrawal not only of that specific blade but also of all other blades as well. That is, means are provided for releasably holding the blades against shifting or shucking in the package during storage or shipment. To that end, in a general way, in one embodiment of the invention a package is provided of such dimensions that the convolution of each blade of a plurality of endless blades holds the blade in a generally kidney-shaped configuration, with one blade being nested inside of another, and with the outermost blade being in snug engagement with pads or blocks or fillers at opposite sides of the recess defined by the package interior.

In another embodiment of the invention, a package is provided for precut lengths of blade stock which incorporates guide means for guiding a blade through a blade exit opening in an otherwise sealed package.

Among advantages provided by the illustrative embodiments of the container are those resulting from the facts that they are quickly and easily loaded, will snugly hold any one of a large range of blade sizes and, in one embodiment, allows access to both sides of the coil so as to provide a firm grip between both hands as allowed by the large opening provided by a raising or removing of the cover in the container top wall.

With the above objects in view and such others as will appear as the description proceeds, this invention resides in the novel construction, combination and arrangement of parts substantially as hereinafter described, it being understood that such changes in the precise embodiments of the herein disclosed invention may be made as come within the scope of the appended claims.

The accompanying drawings illustrate the physical embodiments of the invention constructed in accordance with the best modes so far devised for the practical application of the principles thereof, and in which:

FIG. 1 is a view, in perspective, of one form of package with a half-portion of the front cover shown in a raised or opened position;

FIG. 2 is an enlarged broken and sectional view taken on line 2—2 of FIG. 1;

FIG. 3 is an enlarged broken and sectional view taken on line 3—3 of FIG. 1;

Figure 4:
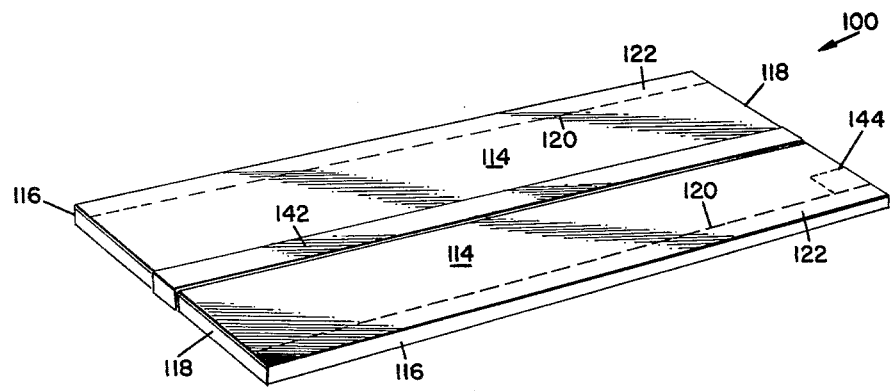
FIG. 4 is a view, in perspective, of another form of the package of the invention.

Referring particularly to the accompanying drawings, in FIGS. 1 through 3, numeral 10 generally designates a package or box or container for bandsaw blades of the endless type and comprising a bottom wall 12 and a top cover comprised substantially of a pair of juxtaposed half-portions 14 which unisonly overlie bottom wall 12 and are spaced therefrom as by a pair of side walls 16 disposed at opposite sides of and secured to the bottom wall and a pair of end walls 18 disposed at opposite ends of and secured to the bottom wall, said side and end walls abutting each other at the defined corners in conventional box-making manner.

Each half-portion 14 of the top cover is secured to a respective side wall 16 and is scored inwardly of its outer side edge, as at 20, to provide a hinge means by which the major part of the half-portion may be hingedly related to the remainder of the package wherefore the container may be opened so as to allow easy access to the interior thereof, while yet allowing a narrow retaining portion 22 which will overlie a portion of the saw blades disposed therein, as will hereinafter appear.

The top and bottom walls are spaced apart such a distance as to provide a container depth just sufficient to receive the width of the widest band to be disposed therebetween, and the size of the box is such as to maintain the band under substantial tension, the box being preferentially, but not obligatorily, rectangular as to width and length.

End walls 18 are each provided at their upper edges with an inwardly extending retaining portion 30 disposed in spaced, parallel relationship to bottom wall 12; said retaining portions overlying a portion of the saw blades disposed within box 10.

Box 10 is preferably formed from cardboard or the like for economy of manufacture, although other materials may be employed without departing from the spirit and scope of the invention.

A plurality of longitudinally-extending cardboard fillers or pads 40 are disposed adjacent side walls 16 below retaining portion 22 and between end walls 18. Fillers 40 will completely fill the space between retaining portion 22 and bottom wall 12 at each side of the box. It will be understood that wooden or plastic spacing blocks or pads or equivalent may be employed if desired in lieu of the cardboard fillers 40 above described.

Bottom wall 12 may optionally be provided with openings 50 wherefore box 10 may be suspended from a wall or other support, and half-portions 14 of the top cover may optionally be provided with hand-engaging openings 52 therein wherefore the box may be easily transported.

The box above described is adapted to contain a plurality of endless bandsaw blades generally indicated by S therein.

To load the blades into the box, cover half-portions 14 are raised. A first blade S' is then inserted under retaining portions 30 at opposite ends of the box whereupon one side edge of the blade is urged into frictional engagement with one of the filler pads 40 for a major portion of its length and the other side edge of the blade is urged into frictional engagement with the other of the filler pads 40 only at spaced points along its length for the reason that the dimensions of the box are such that the blade is forced to assume a somewhat kidney shape upon its insertion into the recess defined by the box interior.

From a consideration of FIG. 1, it will be observed that the said first blade S' is in light frictional engagement with both end walls 18, contacts rear filler pad 40 at spaced points thereon, and contacts the major portion of front filler pad 40, and makes no contact with any of the box corners, being spaced therefrom at the opposite ends of the box for the reason that the box is of suitable dimensions to accept the full length of said blade without binding or forcing the fit.

The next blade, identified as S'', is inserted inwardly of first blade S' in contiguous nested relationship thereto and will contact blade S' at various points therealong, but will not be so tightly engaged therewith as to make difficult its removal from the box.

Additional blades, not shown, may be disposed in similar manner, inwardly of blade S'' and in contiguous nested relationship to each other.

The natural resiliency of the blades, acting through the tension under which they are placed upon being coiled, serves to frictionally hold same against the pads and end walls effectively precluding their displacement within the box.

It will be apparent that the box of FIGS. 1–3 may be modified to accommodate endless blades of various sizes without departing from the spirit of the invention.

The blades will be disposed within the box with their teeth down, effectively preventing damage thereto or injury to the user.

Following insertion of the desired number of blades, the cover half-portions are closed at which time the box is ready for shipment or storage.

The bottom wall of the box, being provided with hook apertures, its transportation or its suspension from a wall or bench is facilitated, and the user may employ both hands when removing a blade.

Figure 5:
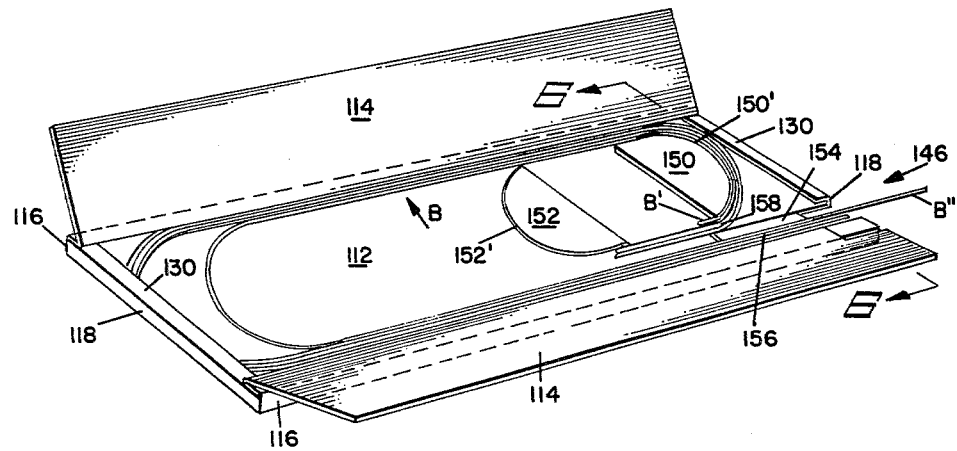
FIG. 5 is a view, in perspective, of the package shown in FIG. 4, with the half-portions of the front cover being shown in a raised or opened position for purposes of clarity.
Figure 6:
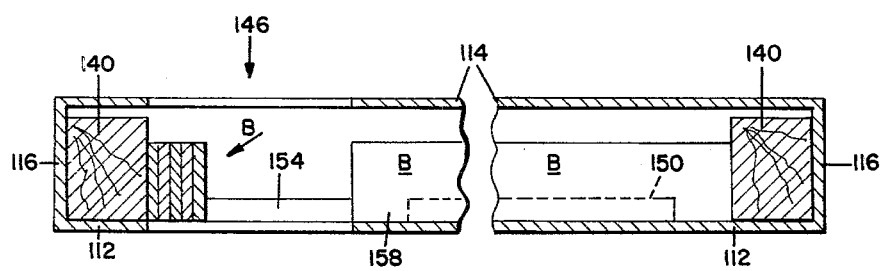
FIG. 6 is an enlarged broken and sectional view substantially on line 6—6 of FIG. 6, but with the half-portions shown in a lowered or closed position.

Referring now to FIGS. 4–6, numeral 100 generally designates a package or box or container for bandsaw blades which have been precut to a desired length but the ends of which have not been joined together. On occasion, consumers demand such type of blade, rather than the endless type, so that the blade can be fitted to a particular machine with greater accuracy.

Basically, container 100 is similar to container 10 aforedescribed and comprises a bottom wall 112, a top cover comprised substantially of a pair of juxtaposed half-portions 144 which together overlie bottom wall 112 and are spaced therefrom as by a pair of side walls 116 disposed at opposite sides of and secured to the bottom wall, and a pair of end walls 118, 118 disposed at opposite ends of and secured to the bottom wall, said side and end walls abutting each other at the defined corners in conventional box-making manner.

Each half portion 114 is secured to a respective side wall 116 and is scored inwardly of its outer side edge, as at 120, to provide a hinge means wherefore the container may be opened so as to allow easy interior access for insertion of blades thereinto while allowing a narrow retaining portion 122 which will overlie a portion of the saw blades disposed therein.

End walls 118 are each provided at their upper edges with an inwardly extending retaining portion 130 disposed in spaced parallel relationship to bottom wall 112; said retaining portions 130 will overlie a portion of the saw blades disposed within box 100.

Alternatively, the cover member could be formed in one piece and the bottom wall could be split into half-portions when and where bottom loading is a desideratum.

A plurality of longitudinally-extending blocks or pads 140 are disposed adjacent side walls 116 below retaining portion 122 and between end walls 118. Blocks 140 will completely fill the space between retaining portion 122 and bottom wall 112 at each side of the box. Conceivably cardboard fillers, similar to those employed with the box of FIGS. 1–3, could be employed in lieu of blocks 140.

The box comprehends being sealed by the supplier and, preferably, will not be opened by the consumer except for the provision of a blade withdrawal opening, subsequently to be described.

Following the insertion of a plurality of precut bandsaw blades B into the box by the supplier, cover half-portions 114 are closed and are held in this closed position as by sealing tape 142 or equivalent. As before stated, the bottom wall could be configured as the cover member to allow bottom loading.

One of said cover half portions 114 will be scored, as will one end wall 118, one retaining portion 130 and the bottom wall 112. As seen in FIG. 4, a scored portion 144 in the cover half-portion 114 is generally rectangular or square in configuration and is disposed immediately adjacent one of the end walls 118 and extends inwardly therefrom in spaced parallel relation to one of the side walls 116. While not appearing in the drawings, this scored portion 144 continues around the end wall of the box to the bottom wall wherein an identical scored portion is provided. The scoring of the cover half-portion, end wall and bottom wall facilitates the removal of a portion of these members to provide a convenient blade withdrawal opening generally indicated by 146 at one end of the box.

By reason of this novel feature, the blades within the box are completely protected during shipment, but are readily accessible to the consumer merely by cutting through the box along the scored lines so as thereby to expose one free end of the blades, as will appear.

With reference to FIG. 5, a pair of guide blocks 150 and 152 are fixed to the upper surface of bottom wall 112 by gluing, stapling or other suitable means, adjacent that end of the box having the blade withdrawal opening 146 and are disposed in spaced relation as to each other.

Guide block 150, designated for purposes of orientation as the outermost guide block, has an arcuate wall or face 150' facing the end wall 118 having the blade withdrawal opening 146 therein. Guide block 152, designated as the innermost guide block, has an arcuate wall or face 152' facing the opposite end wall 118.

A guide bar 154 is also fixed to the upper surface of bottom wall 112 and extends longitudinally of said bottom wall in spaced parallel relation to the filler blocks 140 and has its outermost end contiguous with the innermost end of the blade withdrawal opening 146. Such positioning of guide bar 154 provides a blade-receiving space 156 on one side thereof between it and the adjacent filler block 140 and provides a blade-receiving space 158 on the other side thereof between it and the outermost guide block 150.

As previously mentioned, blades B are not of the endless type but are cut to desired lengths and have opposite free ends.

One of said free ends, designated as the innermost free end B', is disposed in blade-receiving space 158 between guide bar 154 and guide block 150. The opposite or outermost free end B" is disposed in blade-receiving space 156 between guide bar 154 and filler block 140.

From blade-receiving space 158, blade B extends in snugly embracing manner around arcuate surface 150' of guide block 150 to that filler block 140 which is distantly removed from blade withdrawal opening 146.

The blade extends longitudinally along said block 140 to that end wall 116 which is distantly removed from blade withdrawal opening 146 where it curves under retaining portion 130 to contact the other filler block 140. It then extends along this last-named filler block 140 to guide space 156, with free end B" being disposed in blade withdrawal opening 146.

Additional blades are disposed in the box in like manner, outwardly of the first blade positioned therein.

To withdraw a blade from the box, the consumer grasps free outer end B" of the blade and pulls outwardly. As he continues to pull, free inner end B' remains in the space 158, being lightly wedged between guide bar 154 and guide block 150, but with that portion of the blade previously disposed under retaining portion 130 at the opposite end of the box being pulled toward arcuate surface 152' of guide block 152 until it contacts same.

Additional outward pulling force now applied to free outer end B" causes free inner end B' to move from its position in space 158 and to travel around the arcuate surface 150' of guide block 150 to guide block 152. When inner free end B' clears guide block 152, it swings from a position adjacent that filler block 140 which is removed from blade withdrawal opening 146 to a position adjacent that filler block 140 which is contiguous with said blade withdrawal opening.

The free inner end of the blade may now be drawn straight out from the box through the withdrawal opening, being guided in its travel by guide bar 154.

Additional blades will be withdrawn from the box in similar manner, it being noted that at no time is it necessary to have access to the interior of the box to remove the blades.

The box will be of such dimensions, and the guide blocks and guide bar will be so strategically positioned upon the bottom wall thereof, that the blades will be firmly held against movement in transit, while offering little or no resistance to blade withdrawal by the consumer.

The natural resiliency of the blades, acting through the tension under which they are placed upon being coiled, also serves to frictionally hold same against the blocks and end walls effectively precluding their displacement within the box during transit.

From the foregoing, it will be apparent that we have provided a truly novel means for releasably supporting, maintaining and storing a plurality of endless or precut bandsaw blades in nested relationship wherein the user may conveniently withdraw a blade or blades therefrom.

We claim:
1. Packaging means comprising, a container having spaced side and end walls interconnected by top and bottom walls, a plurality of nested endless length bandsaw blades within said container, retaining portions on said end walls releasably holding said plurality of bandsaw blades within said container, spacing pads within said container adjacent said side walls and substantially coextensive therewith, said top wall defining a cover comprised of two half-portions hingedly connected to said side walls, said side walls being of greater length than said end walls and the lengths of said bandsaw blades being greater than the perimeter of said container for urging said bandsaw blades into a substantially elliptical configuration within said container, with the convolution of one of said blades being in frictional engagement with said end walls and spacing pads.

2. Packaging means as set forth in claim 1 including a blade withdrawal opening in said container, a pair of spaced semi-circular guide blocks and a guide bar fixed to said bottom wall adjacent said blade withdrawal opening, said plurality of bandsaw blades being precut to predetermined lengths, a portion of one of said bandsaw blades extending around said guide blocks, and a free end of said one of said bandsaw blades being guided into said blade withdrawal opening by said guide bar.

References Cited by the Examiner

UNITED STATES PATENTS

| 2,327,156 | 8/43 | Scott | 206—59 |
|---|---|---|---|
| 2,333,099 | 11/43 | Gerking | 206—56 |
| 2,490,732 | 12/49 | Hess et al. | 206—16 |
| 3,087,608 | 4/63 | Craven | 206—52 |
| 3,115,242 | 12/63 | Kolesh | 206—52 |
| 3,115,243 | 12/63 | Nash | 206—52 |

FOREIGN PATENTS 710,703   6/54   Great Britain.

LOUIS G. MANCENE, *Primary Examiner.*